(12) United States Patent
Kim

(10) Patent No.: US 6,881,938 B2
(45) Date of Patent: Apr. 19, 2005

(54) FAN MOTOR AND MICROWAVE OVEN HAVING THE SAME

(75) Inventor: Heung-Yi Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/611,973

(22) Filed: Jul. 3, 2003

(65) Prior Publication Data

US 2004/0149750 A1 Aug. 5, 2004

(30) Foreign Application Priority Data

Jan. 3, 2003 (KR) .................... 10-2003-0000210

(51) Int. Cl.⁷ .................................. H05B 6/64
(52) U.S. Cl. ................. 219/757; 126/21 A; 310/89
(58) Field of Search .................. 219/757, 756, 219/758, 760, 746, 681, 685, 400; 126/21 A; 528/176, 184, 272; 310/44, 686, 71, 72, 89, 90, 62, 88, 254, 67 R, 68 R, 157, 162

(56) References Cited

U.S. PATENT DOCUMENTS

| | | | |
|---|---|---|---|
| 3,699,368 A | * | 10/1972 | Palmer ..................... 310/88 |
| 3,711,732 A | * | 1/1973 | Gerber et al. ............. 310/162 |
| 4,156,821 A | | 5/1979 | Kurome et al. |
| 4,862,026 A | * | 8/1989 | Riback ..................... 310/90 |
| 5,287,030 A | | 2/1994 | Nutter |
| 5,393,961 A | * | 2/1995 | Umekage et al. .......... 219/757 |
| 5,477,036 A | * | 12/1995 | Jun et al. ................. 219/757 |
| 5,990,467 A | * | 11/1999 | Yang et al. ............... 219/757 |
| 6,376,952 B1 | | 4/2002 | Stenta |
| 6,528,773 B1 | * | 3/2003 | Kim et al. ................ 219/681 |

FOREIGN PATENT DOCUMENTS

| | | |
|---|---|---|
| EP | 0829943 A1 | 3/1998 |
| KR | 95-33878 | 12/1995 |
| WO | WO 87/07097 | 11/1987 |
| WO | WO 01/35515 A1 | 5/2001 |

* cited by examiner

*Primary Examiner*—Quang T. Van
(74) *Attorney, Agent, or Firm*—Staas & Halsey LLP

(57) ABSTRACT

A fan motor having a simple construction and a microwave oven equipped with the fan motor. The fan motor includes a stator, a rotor, a rotating shaft extending from both ends of the rotor, a support unit mounted to a front of the stator, and a bearing inserted in a through hole of the support unit. The bearing forwardly extends from the support unit, and is set into a boss mounted to a rear of the support unit. A stopper in front of the bearing fits over an insert groove formed at an outer surface of the rotating shaft, and is stopped by a front end of the bearing, preventing the rotating shaft from being rearwardly removed from the stator. A blowing fan mounted to a front end of the rotating shaft cools electrical devices and ventilates a cooking cavity of the microwave oven.

23 Claims, 5 Drawing Sheets

FAN MOTOR AND MICROWAVE OVEN HAVING THE SAME

CROSS-REFERENCE TO RELATED APPLICATIONS

This application claims the benefit of Korean Patent Application No. 2003-210, filed Jan. 3, 2003, in the Korean Intellectual Property Office, the disclosure of which is incorporated herein by reference.

BACKGROUND OF THE INVENTION

1. Field of the Invention

The present invention relates, in general, to a fan motor and a microwave oven equipped with the fan motor and, more particularly, to a fan motor having a simple construction and a microwave oven with the fan motor.

2. Description of the Related Art

A microwave oven is an appliance that heats and/or cooks food placed in its cooking cavity using high-frequency electromagnetic waves generated by the oscillation of a magnetron installed in an electrical device cavity of the microwave oven. That is, during a cooking process, the magnetron installed in the electrical device cavity radiates high-frequency electromagnetic waves, so-called "microwaves," into the cooking cavity. The microwaves penetrate the food to repeatedly change the molecular arrangement of water laden in the food, thus causing the molecules of water to vibrate and generate frictional heat within the food to cook the food.

The microwave oven is partitioned into the electrical device cavity and the cooking cavity. Several electrical devices, including the magnetron that generates the microwaves, are installed in the electrical device cavity. Food to be cooked is placed in the cooking cavity.

A blowing unit is also installed in the electrical device cavity. The blowing unit removes heat generated by operation of the electrical devices, such as the magnetron, and discharges food odors and smoke generated during the cooking process outside the microwave oven.

Thus, when the blowing unit operates, air is fed into the electrical device cavity to cool the electrical devices in the electrical device cavity. After the air cools the electrical devices, the air passes through the cooking cavity to discharge food odors and smoke generated while cooking to the exterior of the microwave oven.

Generally, the blowing unit includes a fan motor and a blowing fan that is driven by the fan motor. The fan motor has a stator, a rotor that rotates by electromagnetic interaction with the stator, and a rotating shaft that rotates with the rotor to rotate the blowing fan.

The rotating shaft is inserted into the rotor to with the rotor, and extends from both ends of the rotor. The blowing fan is mounted to an end of the rotating shaft. When the blowing fan is rotated by the fan motor, the electrical device cavity is cooled and the cooking cavity is ventilated.

Brackets are mounted to front and rear surfaces of the stator so that both ends of the rotating shaft rotate on a fixed axis when the rotating shaft passing through the rotor rotates with the rotor. Each bracket has a through hole so that the rotating shaft passes through the bracket. Thus, the rotating shaft is rotatably held by the brackets.

The rotating shaft of the conventional fan motor has a length sufficient for the rotating shaft to be held by the brackets, which are mounted to the stator such that one of the brackets is positioned in front of the rotor and the other bracket is positioned in back of the rotor to allow the rotating shaft to rotate on a fixed axis. Thus, the number of components of the fan motor is increased, which increases the manufacturing cost and time, thereby increasing the cost of the microwave oven having the conventional fan motor.

SUMMARY OF THE INVENTION

It is an aspect of the present invention to provide a fan motor having a simple construction and a microwave oven with the fan motor.

Additional aspects and/or advantages of the invention will be set forth in part in the description that follows and, in part, will be obvious from the description, or may be learned by practice of the invention.

To achieve the above and/or other aspects of the present invention, there is provided a fan motor, including a stator; a rotor surrounded by the stator; a rotating shaft inserted into the rotor that rotates with the rotor, the rotating shaft extending from both ends of the rotor; a support unit mounted to a front of the stator, and having a through hole to receive the rotating shaft; and a bearing inserted in the through hole of the support unit to rotatably hold the rotating shaft passing through the bearing, a front part of the bearing extending outwardly from the through hole of the support unit by a predetermined length to rotate both ends of the rotating shaft on a fixed axis.

The bearing has a rear part and the support unit has a boss that integrally and rearwardly extends from an edge of the through hole by a predetermined length, with the rear part of the bearing being set in the boss.

A stopper fits over an insert groove formed around an outer surface of the rotating shaft in front of the bearing to prevent the rotor and the rotating shaft from being rearwardly removed from the stator.

The stopper has a semi-circular cross-section, and has, at an inner circumference thereof, a plurality of locking projections that engage the insert groove to hold the stopper within the insert groove.

A depressed seat is provided around the through hole of the support unit, and an oil absorption member soaked with oil is seated in the depressed seat to feed oil into the bearing.

An oil cap covers the depressed seat to prevent exposure of the oil absorption member to an exterior or the stator.

To achieve the above and/or other aspects of the present invention, there is provided a microwave oven having a cabinet to define an external appearance of the microwave oven; a cooking cavity and an electrical device cavity within the cabinet; a blowing fan installed in the electrical device cavity; and a fan motor to rotate the blowing fan, the fan motor comprising a stator; a rotor surrounded by the stator; a rotating shaft inserted into the rotor that rotates with the rotor, the rotating shaft extending from both ends of the rotor; a support unit mounted to a front of the stator, and having a through hole to receive the rotating shaft; and a bearing inserted in the through hole of the support unit to rotatably hold the rotating shaft passing through the bearing, a front part of the bearing extending outwardly from the through hole of the support unit by a predetermined length to rotate both ends of the rotating shaft on a fixed axis.

To achieve the above and/or other aspects according to the present invention, there is provided a blowing unit, including a fan housing; a fan mounted to a side of the fan housing; and a fan motor to rotate the fan, the fan motor being mounted to another side of the fan housing and comprising, a stator, a rotor surrounded by the stator, a rotating shaft inserted into the rotor that rotates with the rotor, the rotating shaft extending from both ends of the rotor, a support unit mounted to a front of the stator, and having a through hole to receive the rotating shaft, and a bearing inserted in the through hole of the support unit to rotatably hold the rotating shaft passing through the bearing, a front part of the bearing extending outwardly from the through hole of the support unit by a predetermined length to rotate both ends of the rotating shaft on a fixed axis.

These together with other aspects and/or advantages that will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and/or other aspects and advantages of the invention will become apparent and more readily appreciated from the following description of the preferred embodiments, taken in conjunction with the accompanying drawings, of which.

DETAILED DESCRIPTION OF THE PREFERRED EMBODIMENTS

Figure 1:
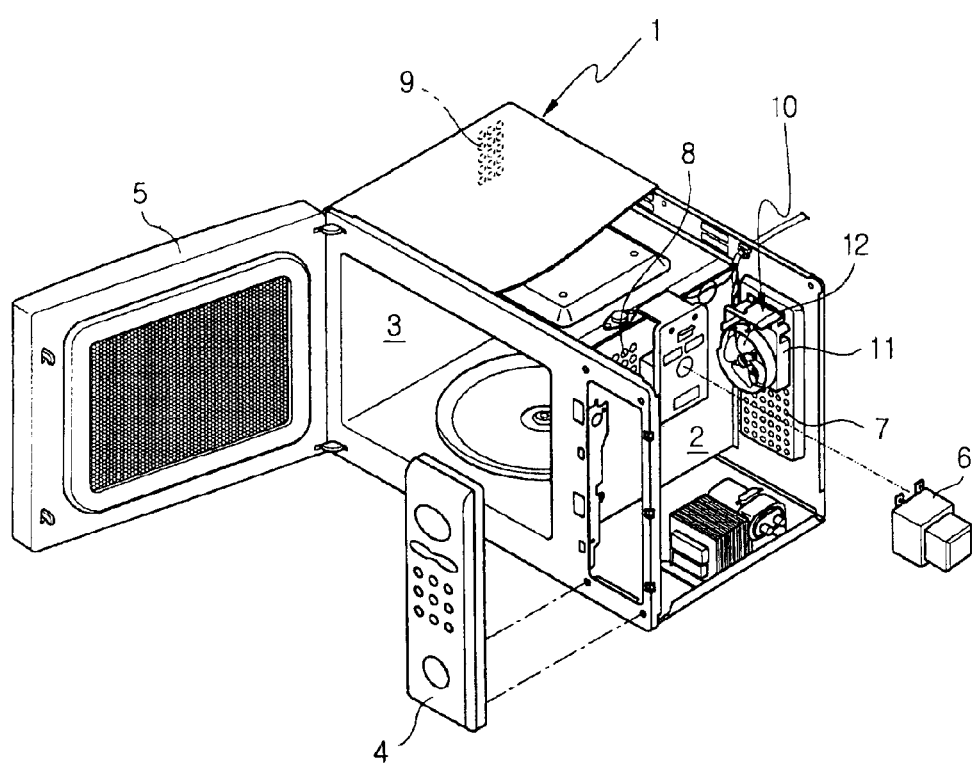
FIG. 1 is an exploded perspective view of a microwave oven having a blowing unit with a fan motor, according to an embodiment of the present invention.

Hereinafter, embodiments of the present invention will be described in detail with reference to the attached drawings, wherein the like reference numerals refer to the like elements throughout. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 2:
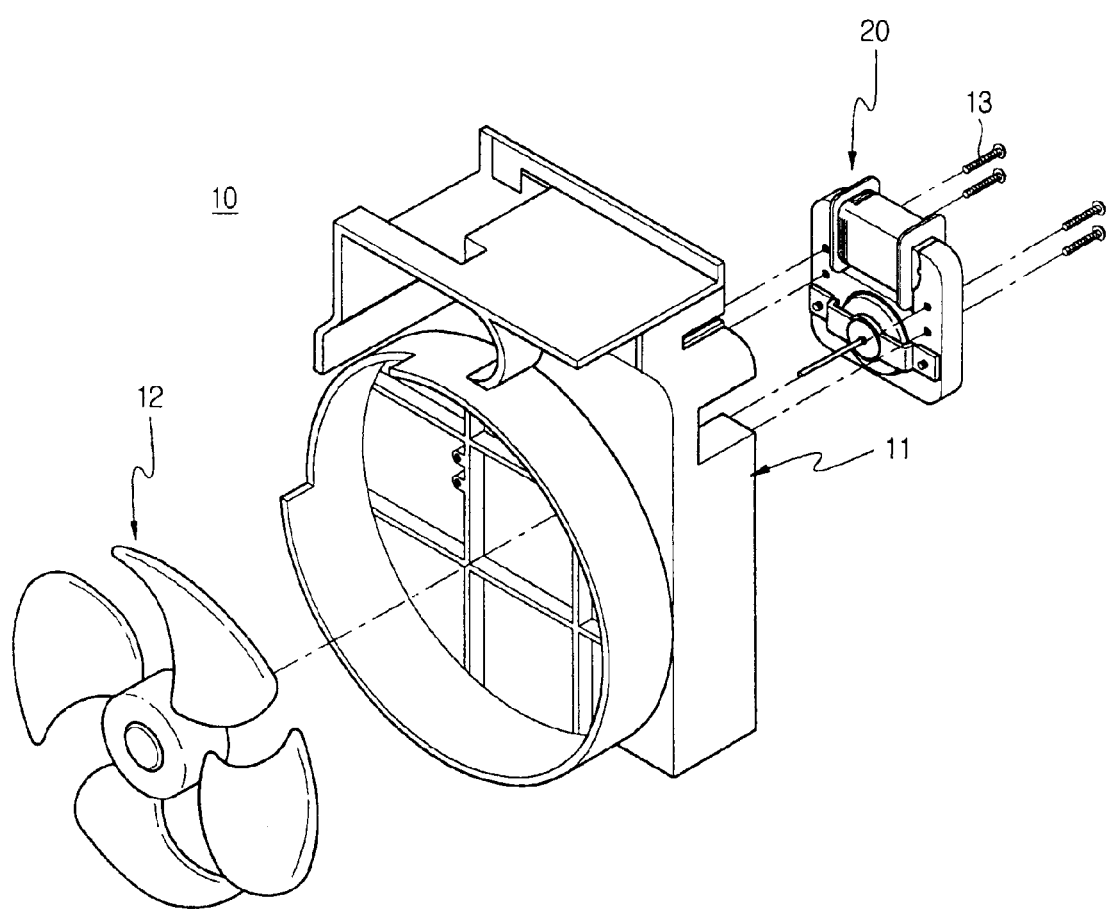
FIG. 2 is an exploded perspective view of the blowing unit illustrated in FIG. 1.

FIG. 1 is an exploded perspective view of a microwave oven having a blowing unit with a fan motor, according to an embodiment of the present invention. FIG. 2 is an exploded perspective view of the blowing unit illustrated in FIG. 1.

As illustrated in FIG. 1, the microwave oven according to the present invention includes a cabinet 1 that defines an external appearance of the microwave oven. The cabinet 1 is partitioned into an electrical device cavity 2 and a cooking cavity 3. A control panel 4 is mounted to a front of the electrical device cavity 2. A door 5 is mounted to a front of the cooking cavity 3.

Several electrical devices, including a magnetron 6 that generates microwaves and a blowing unit 10 for cooling the electrical devices, are installed in the electrical device cavity 2. The blowing unit 10 is mounted to a rear wall of the electrical device cavity 2.

A plurality of perforations 7 are provided in the rear wall of the electrical device cavity to feed air into the electrical device cavity 2. Further, a plurality of perforations 8 and 9 are provided in the sidewalls of the cooking cavity 3, so that air fed into the electrical device cavity 2 by the blowing unit 10 circulates through the cooking cavity 3.

Thus, when the microwave oven operates, food placed in the cooking cavity 3 is cooked by microwaves radiated from the magnetron 6. Simultaneously, the blowing unit 10 feeds air into the electrical device cavity 2 through the perforations 7. After air fed into the electrical device cavity 2 cools the electrical devices, the air passes through the cooking cavity 3 through the perforations 8 and 9, thus forcibly discharging gas and odors produced from food during the cooking process from the cooking cavity 3 to the exterior of the microwave oven.

As illustrated in FIG. 2, the blowing unit 10 includes a fan housing 11, a fan motor 20, and a blowing fan 12. The fan housing 11 is mounted to the rear wall of the electrical device cavity 2. The fan motor 20 is mounted to the fan housing 11. The blowing fan 12 is operated by the fan motor 20. In the embodiment shown in FIG. 2, the fan motor 20 is mounted to the fan housing 11 using a plurality of screws 13, for example.

Thus, when the fan motor 20 operates, the blowing fan 12 mounted to the fan motor 20 rotates, so that air is fed into the electrical device cavity 2 through the perforations 7.

The fan motor according to the embodiment of the present invention is described below, with reference to FIGS. 3 through 5.

Figure 3:
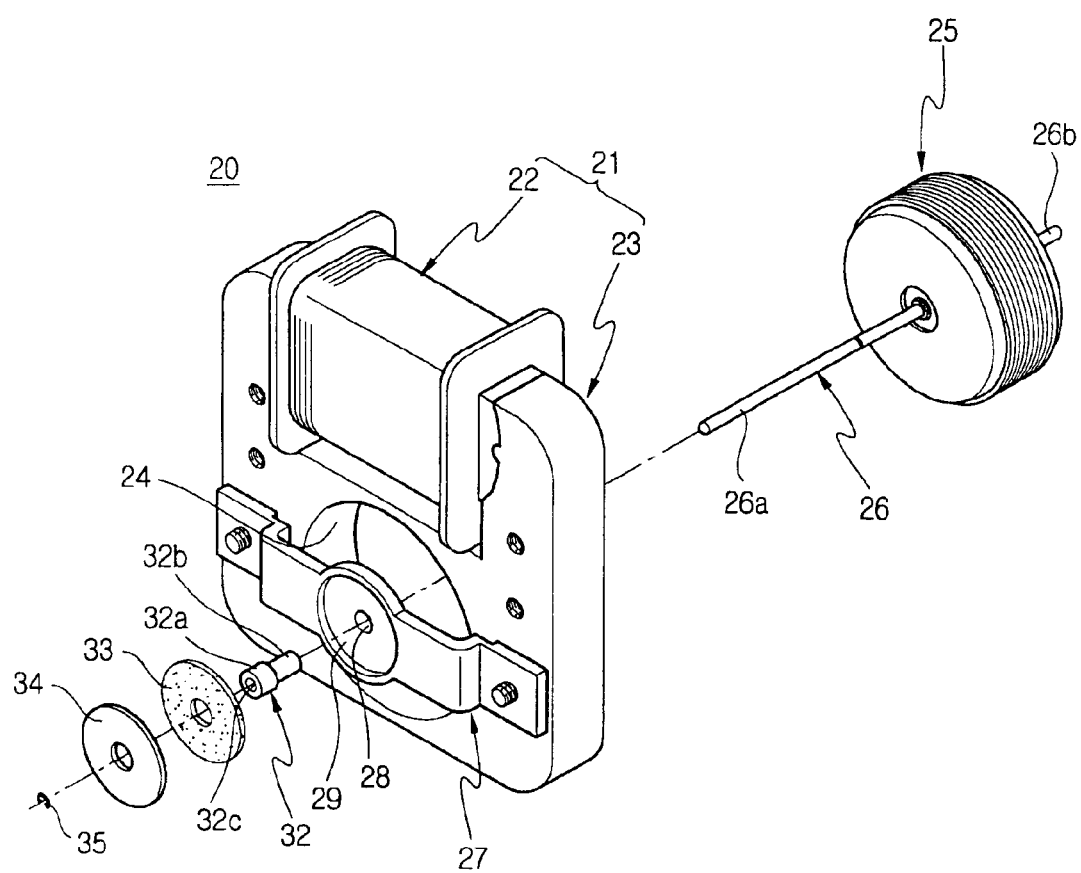
FIG. 3 is an exploded perspective view of the fan motor illustrated in FIG. 2.

FIG. 3 is an exploded perspective view of the fan motor 20. As illustrated in FIG. 3, the fan motor 20 of the present invention includes a stator 21, a rotor 25, and a rotating shaft 26.

The stator 21 has a coil 22 to which an electric current is applied, and a core 23 that passes through the coil 22 and has a rectangular cross-section. When an electric current is applied to the coil 22, a magnetic field is formed at the core 23 to rotate the rotor 25. An opening 24 is provided on the core 23 with an outer diameter that is slightly larger than that of the rotor 25, thus allowing the rotor 25 to be rotatably set in the core 23.

The rotor 25 has a cylindrical shape. The rotating shaft 26 is inserted into a center of the rotor 25 to rotate with the rotor 25. A front part 26a of the rotating shaft 26 forwardly extends from the rotor 25 toward the stator, while a rear part 26b of the rotating shaft 26 rearwardly extends from the rotor 25. The rotating shaft 26 is inserted into the rotor 25 such that the front part 26a is longer than the rear part 26b. The blowing fan 12 (FIG. 2) is rotatably mounted to an end of the front part 26a.

A support unit 27 is attached to the core 23 at a front surface of the stator 21 to support the front part 26a of the rotating shaft 26. The support unit 27 has at its center a through hole 28 through which the rotating shaft 26 passes. A depressed seat 29 having a predetermined diameter is provided around the through hole 28.

An oilless bearing 32 is installed in the through hole 28 of the support unit 27 to rotatably hold the front part 26a of the rotating shaft 26. An annular oil absorption member 33 soaked with oil and an oil cap 34 for covering the oil absorption member 33 are seated in the depressed seat 29.

Thus, oil present in the oil absorption member 33 flows along an edge of the depressed seat 29 and is fed into the bearing 32, thus allowing the rotating shaft 26 to smoothly rotate in the bearing 32.

The bearing 32 has a larger diameter part 32a and a smaller diameter part 32b. The larger diameter part 32a is larger in its outer diameter than the smaller diameter part 32b, and defines the front part of the bearing 32. The smaller diameter part 32b, which is integrated with the larger diameter part 32a to form a single unit, is smaller in its outer diameter than the larger diameter part 32a, and defines the rear part of the bearing 32. The larger diameter part 32a interfaces with the smaller diameter part 32b through a hole 32c having a predetermined diameter. The smaller diameter part 32b is inserted into the through hole 28 of the support unit 27 and the larger diameter part 32a is forwardly projected from the support unit 27. Further, the front part 26a of the rotating shaft 26 is rotatably inserted into the hole 32c of the bearing 32.

The rotating shaft 26 is slightly smaller in diameter than the hole 32c of the bearing 32 so that the rotating shaft 26 tightly fits into the bearing 32, thus allowing the rotating shaft 26 to rotate on a fixed axis.

Further, a stopper 35 fits over the front part 26a of the rotating shaft 26 to prevent the rotating shaft 26 and the rotor 25 from being rearwardly removed from the stator 21. The construction of the stopper 35 is described below, with reference to FIG. 5.

Figure 4:
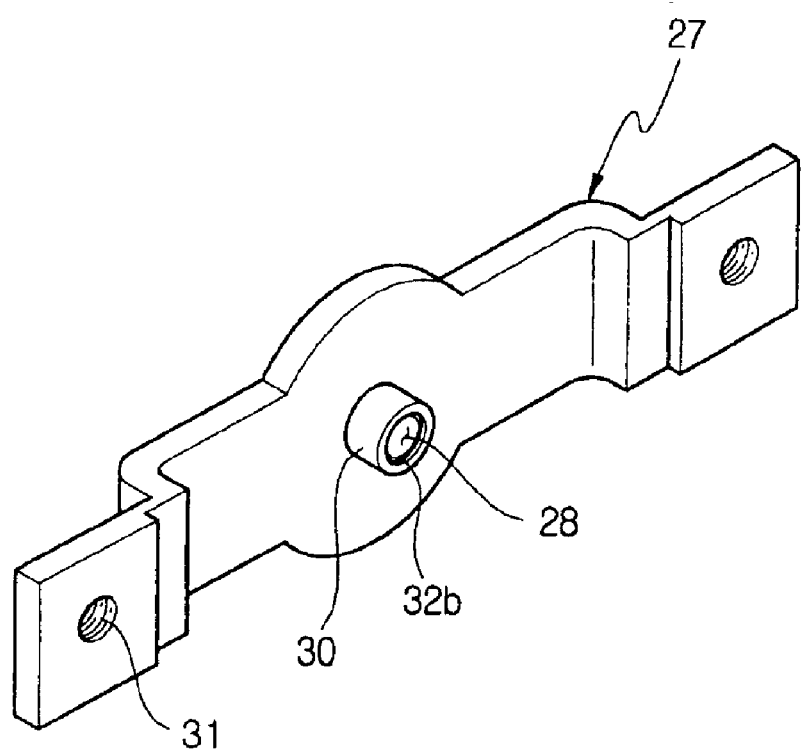
FIG. 4 is a rear perspective view illustrating a support unit for supporting a rotating shaft that is included in the fan motor of FIG. 3.

FIG. 4 is a rear perspective view illustrating the support unit 27 for supporting the rotating shaft 26. As illustrated in FIG. 4, a boss 30 is integrally mounted to a rear surface of the support unit 27 to rearwardly extend from an edge of the through hole 28 of the support unit 27. Two screw holes 31 are provided at both sides of the support unit 27 to attach the support unit 27 to the core 23 of the stator 21 through the screw holes 31.

Because the bearing 32 is arranged such that the smaller diameter part 32b forming the rear part of the bearing 32 is set in the boss 30, the bearing 32 has a length sufficient for placement in the boss 30. The bearing 32 supports the rotating shaft 26 to allow the rotating shaft 26 to rotate on a fixed axis.

Figure 5:
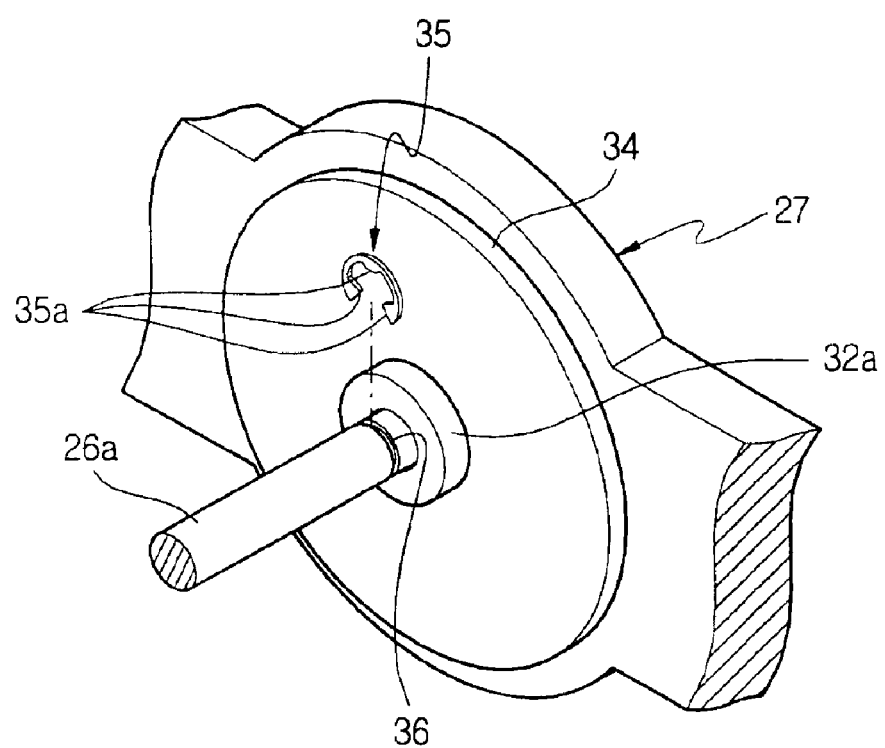
FIG. 5 is an enlarged perspective view illustrating a stopper that fits over the rotating shaft of the fan motor of FIG. 3.

FIG. 5 is an enlarged perspective view illustrating the stopper 35 that fits over the rotating shaft 26 of the fan motor 20. As illustrated in FIG. 5, the stopper 35 fits over the front part 26a of the rotating shaft 26, thus preventing the rotating shaft 26, which is rotatably inserted into the hole 32c of the bearing 32, from being rearwardly removed from the stator 21.

The stopper 35 has a semi-circular cross-section, and has along its inner circumference a plurality of locking projections 35a. Further, an insert groove 36 is formed on the front part 26a of the rotating shaft 26 in front of the larger diameter part 32a of the bearing 32 so that the stopper 35 fits over the insert groove 36.

Thus, when the stopper 35 is pressed down with respect to the insert groove 36, the stopper 35 elastically widens while the locking projections 35a of the stopper 35 engage the insert groove 36 such that the stopper 35 fits over the insert groove 36. When the stopper 35 fits over the insert groove 36, the stopper 35 engages the larger diameter part 32a of the bearing 32, thus preventing the front part 26a of the rotating shaft 26 from being rearwardly removed from the stator 21.

When the fan motor 20 of the present invention operates, the rotor 25 rotates with the rotating shaft 26 by electromagnetic interaction between the stator 21 and the rotor 25. The blowing fan 12 mounted to the front part 26a of the rotating shaft 26 also rotates, thus drawing exterior air into the electrical device cavity 2.

As is apparent from the above description, the present invention provides a fan motor 20 and a microwave oven equipped with the fan motor 20, which is designed such that a rotating shaft 26 of the fan motor 20 is supported to rotate on a fixed axis by a support unit 27 mounted to a front of a stator 21, and a bearing 32 is inserted into a center of the support unit 27. The simple construction of the fan motor 20 reduces the manufacturing cost of the fan motor 20 and the microwave oven equipped with the fan motor 20.

Although an embodiment of the present invention has been shown and described, it will be appreciated by those skilled in the art that changes may be made in this embodiment without departing from the principles and spirit of the invention, the scope of which is defined in the claims and their equivalents.

What is claimed is:

1. A fan motor, comprising:
 a stator;
 a rotor surrounded by the stator;
 a rotating shaft inserted into the rotor that rotates with the rotor, the rotating shaft extending from both ends of the rotor;
 a support unit mounted to a front of the stator, and having a through hole to receive the rotating shaft; and
 a bearing inserted in the through hole of the support unit to rotatably hold the rotating shaft passing through the beanng, a front part of the bearing extending outwardly from the through hole of the support unit by a predetermined length to rotate both ends of the rotating shaft on a fixed axis.

2. The fan motor according to claim 1, wherein the bearing has a rear part and the support unit has a boss that integrally and rearwardly extends from an edge of the through hole by a specified amount, with the rear part of the bearing being set in the boss.

3. The fan motor according to claim 2, wherein the front part of the bearing is larger in diameter than the rear part of the bearing.

4. The fan motor according to claim 2, further comprising a stopper that fits over an insert groove formed around an outer surface of the rotating shaft in front of the bearing to prevent the rotor and the rotating shaft from being rearwardly removed from the stator.

5. The fan motor according to claim 4, wherein the stopper has a semi-circular cross-section, and has, at an inner circumference thereof, a plurality of locking projections that engage the insert groove to hold the stopper within the insert groove.

6. The fan motor according to claim 2, wherein the bearing is an oilless bearing.

7. The fan motor according to claim 6, further comprising an oil absorption member soaked with oil and a depressed seat provided around the through hole of the support unit, the oil absorption member being seated in the depressed seat to feed oil around the bearing as the rotating shaft rotates.

8. The fan motor according to claim 7, wherein the oil absorption member is an annular oil absorption member.

9. The fan motor according to claim 7, further comprising an oil cap covering the depressed seat to prevent exposure of the oil absorption member to an exterior of the stator.

10. A microwave oven comprising;
 a cabinet to define an external appearance of the microwave oven;
 a cooking cavity and an electrical device cavity within the cabinet;

a blowing fan installed in the electrical device cavity; and a fan motor to rotate the blowing fan, the fan motor comprising
- a stator,
- a rotor surrounded by the stator,
- a rotating shaft inserted into the rotor that rotates with the rotor, the rotating shaft extending from both ends of the rotor,
- a support unit mounted to a front of the stator, and having a through hole to receive the rotating shaft, and
- a bearing inserted in the through hole of the support unit to rotatably hold the rotating shaft passing through the bearing, a front part of the bearing extending outwardly from the through hole of the support unit by a predetermined length to rotate both ends of the rotating shaft on a fixed axis.

11. The microwave oven according to claim 10, wherein the bearing has a rear part and the support unit has a boss, the boss integrally and rearwardly extending from the support unit to form a cavity corresponding to the through hole, the rear part of the bearing being set in the through hole and the boss.

12. The fan motor according to claim 11, wherein the front part of the bearing is larger in diameter than the rear part of the bearing.

13. The microwave oven according to claim 11, further comprising a stopper that fits over an insert groove formed around an outer surface of the rotating shaft in front of the bearing to prevent the rotor and the rotating shaft from being rearwardly removed from the stator.

14. The microwave oven according to claim 13, wherein the stopper has a semi-circular cross-section. and has, at an inner circumference thereof, a plurality of locking projections that engage the insert groove to hold the stopper within the insert groove.

15. A blowing unit, comprising:

a fan housing;

a fan mounted to a side of the fan housing; and a fan motor to rotate the fan, the fan motor being mounted to another side of the fan housing and comprising,
- a stator,
- a rotor surrounded by the stator,
- a rotating shaft inserted into the rotor that rotates with the rotor, the rotating shaft extending from both ends of the rotor,
- a support unit mounted to a front of the stator, and having a through hole to receive the rotating shaft, and
- a bearing inserted in the through hole of the support unit to rotatably hold the rotating shaft passing through the bearing, a front part of the bearing extending outwardly from the through hole of the support unit by a predetermined length to rotate both ends of the rotating shaft on a fixed axis.

16. The blowing unit according to claim 15, wherein the bearing has a rear part and the support unit has a boss that integrally and rearwardly extends from an edge of the through hole, with the rear part of the bearing being set in the boss.

17. The blowing unit according to claim 16, wherein the front part of the bearing is larger in diameter than the rear part of the bearing.

18. The blowing unit according to claim 16, further comprising a stopper that fits over an insert groove formed around an outer surface of the rotating shaft in front of the bearing to prevent the rotor and the rotating shaft from being rearwardly removed from the stator.

19. The blowing unit according to claim 18, wherein the stopper has a semi-circular cross-section, and has, at an inner circumference thereof, a plurality of locking projections that engage the insert groove to hold the stopper within the insert groove.

20. The blowing unit according to claim 16, wherein the bearing is an oilless bearing.

21. The blowing unit according to claim 20, further comprising an oil absorption member soaked with oil and a depressed seat provided around the through hole of the support unit, the oil absorption member being seated in the depressed seat to feed oil around the bearing as the rotating shaft rotates.

22. The blowing unit according to claim 21, wherein the oil absorption member is an annular oil absorption member.

23. The blowing unit according to claim 21, further comprising an oil cap covering the depressed seat to prevent exposure of the oil absorption member to an exterior or the stator.

* * * * *